(12) United States Patent
Miura

(10) Patent No.: US 11,390,706 B2  
(45) Date of Patent: Jul. 19, 2022

(54) LAMINATED FILM, METHOD FOR PRODUCING SAME, AND POLARIZING PLATE

(71) Applicant: ZEON CORPORATION, Tokyo (JP)

(72) Inventor: Takuya Miura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 195 days.

(21) Appl. No.: 16/963,830

(22) PCT Filed: Jan. 21, 2019

(86) PCT No.: PCT/JP2019/001721  
§ 371 (c)(1),  
(2) Date: Jul. 22, 2020

(87) PCT Pub. No.: WO2019/151027  
PCT Pub. Date: Aug. 8, 2019

(65) Prior Publication Data  
US 2021/0054131 A1  Feb. 25, 2021

(30) Foreign Application Priority Data  
Feb. 2, 2018  (JP) .............................. JP2018-017049

(51) Int. Cl.  
*C08F 293/00* (2006.01)  
*B32B 7/022* (2019.01)  
(Continued)

(52) U.S. Cl.  
CPC ............ *C08F 293/00* (2013.01); *B32B 7/022* (2019.01); *B32B 27/08* (2013.01); *B32B 27/28* (2013.01);  
(Continued)

(58) Field of Classification Search  
CPC ............ C08G 61/08; C08G 2261/3224; C08G 2261/418; C08G 2261/592;  
(Continued)

(56) References Cited

U.S. PATENT DOCUMENTS

2007/0285777 A1  12/2007  Toyoshima et al.  
2018/0065348 A1*  3/2018  Obuchi .................... B32B 7/02  
(Continued)

FOREIGN PATENT DOCUMENTS

JP  2011203400 A  10/2011  
JP  2015031753 A  2/2015  
(Continued)

OTHER PUBLICATIONS

Aug. 4, 2020, International Preliminary Reporton Patentability issued in the International Patent Application No. PCT/JP2019/001721.

*Primary Examiner* — Prashant J Khatri  
(74) *Attorney, Agent, or Firm* — Kenja IP Law PC

(57) ABSTRACT

A layered film includes first, second, and third layers formed of first, second, and third resins, respectively, and provided in this order. The second resin contains an alkoxysilyl group-modified product of a hydrogenated product of a block copolymer; has 0.020% by weight or less of a moisture content as measured by the Karl-Fischer method after immersed in water at 37° C. for 24 hours and then allowed to stand at 23° C. and a humidity of 70% for 24 hours; and has a flexural modulus lower than flexural moduli of the first and third resins. One or both of the first and third resins contain a polymer containing an alicyclic structure. The first resin has a specific water vapor transmission rate. A ratio of a sum of thicknesses of the first and third layers relative to a thickness of the second layer is in a specific range.

6 Claims, 1 Drawing Sheet

(51) Int. Cl.
*B32B 27/08* (2006.01)
*B32B 27/28* (2006.01)
*C08G 61/08* (2006.01)
*G02B 5/30* (2006.01)

(52) U.S. Cl.
CPC ............ *C08G 61/08* (2013.01); *G02B 5/305* (2013.01); *B32B 2307/42* (2013.01); *B32B 2307/546* (2013.01); *B32B 2307/732* (2013.01); *B32B 2551/00* (2013.01); *C08G 2261/11* (2013.01); *C08G 2261/3325* (2013.01); *C08G 2261/3327* (2013.01); *C08G 2261/724* (2013.01)

(58) Field of Classification Search
CPC ........ C08G 2261/60; C08G 2261/3325; C08G 2261/3327; C08G 2261/724; C08F 8/42; G02B 5/30–5/305; B32B 7/00–7/14; B32B 27/00–27/42
See application file for complete search history.

(56) References Cited

U.S. PATENT DOCUMENTS

| | | | |
|---|---|---|---|
| 2019/0009497 | A1 | 1/2019 | Sasaki et al. |
| 2019/0152204 | A1* | 5/2019 | Inoue ...................... B32B 7/022 |

FOREIGN PATENT DOCUMENTS

| | | | | |
|---|---|---|---|---|
| TW | 200632388 A | | 9/2006 | |
| TW | 201736098 A | | 10/2017 | |
| TW | 201802505 A | | 1/2018 | |
| WO | WO-2016152871 A1 | * | 9/2016 | ............ B32B 15/06 |
| WO | 2018008493 A1 | | 1/2018 | |
| WO | WO-2018008493 A1 | * | 1/2018 | ............ B32B 27/00 |

* cited by examiner

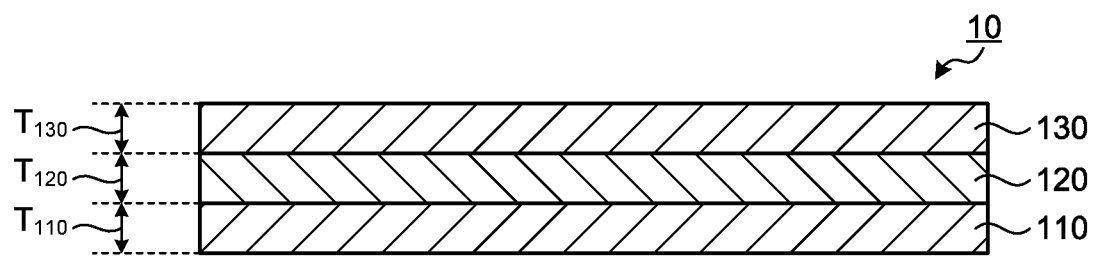

LAMINATED FILM, METHOD FOR PRODUCING SAME, AND POLARIZING PLATE

FIELD

The present invention relates to a layered film, a method for producing the same, and a polarizing plate.

BACKGROUND

A polarizing plate usually includes a polarizer, and a polarizer protective film as an optical film for protecting the polarizer. Patent Literatures 1 and 2 propose layered films having a three-layer structure as polarizer protective films.

CITATION LIST

Patent Literature

Patent Literature 1: Japanese Patent Application Laid-Open No. 2015-031753 A
Patent Literature 2: Japanese Patent Application Laid-Open No. 2011-203400 A

SUMMARY

Technical Problem

The polarizing plate may be provided in an image display device. In recent years, a flexible image display device such as an organic electroluminescent display device (hereinafter, sometimes referred to as "organic EL display device") has attracted attention. The polarizing plate provided in such a flexible image display device preferably has excellent bend resistance. Therefore, a layered film as a polarizer protective film also preferably has excellent bend resistance.

Further, a polarizing plate such as a polarizing plate provided in an image display device for an automobile vehicle may be exposed to high-temperature environments. Therefore, such a layered film serving as a polarizer protective film preferably has excellent heat resistance.

Further, such a layered film is desired to have no air bubbles therein. In particular, an optical film such as a polarizer protective film is particularly strongly desired to have no air bubbles because optical properties thereof may be impaired by air bubbles.

However, no layered films that are excellent in both heat resistance and bend resistance wherein formation of air bubbles is suppressed have been achieved by conventional techniques.

The present invention has been created in view of the above-described problems, and an object of the present invention is to provide a layered film that is excellent in both heat resistance and bend resistance wherein formation of air bubbles is suppressed; a method for producing the same; and a polarizing plate having such a layered film.

Solution to Problem

In order to achieve the above-descried object, the present inventor has intensively studied, and as a result, has found that when a layered film having a first layer formed of a first resin, a second layer formed of a second resin, and a third layer formed of a third resin provided in this order satisfies a combination of specific requirements, the layered film is excellent in both heat resistance and bend resistance and formation of air bubbles therein can be suppressed. This finding has led to the completion of the present invention.

That is, the present invention includes the following.

<1> A layered film comprising: a first layer formed of a first resin; a second layer formed of a second resin; and a third layer formed of a third resin, provided in this order, wherein the second resin contains an alkoxysilyl group-modified product of a hydrogenated product of a block copolymer, a moisture content of the second resin as measured by the Karl-Fischer method after the second resin is immersed in water at 37° C. for 24 hours and then allowed to stand in an environment at 23° C. and a humidity of 70% for 24 hours is 0.020% by weight or less, the second resin has a flexural modulus lower than a flexural modulus of the first resin and lower than a flexural modulus of the third resin, one or both of the first resin and the third resin contain a polymer containing an alicyclic structure, a water vapor transmission rate of the first resin as measured in accordance with JIS K7129 B(1992) when the resin is in a form of a 100 μm-thick film is 5 g/(m²·day) or less, and a ratio of a sum of a thickness of the first layer and a thickness of the third layer relative to a thickness of the second layer is 1 or more and 4 or less.

<2> The layered film according to <1>, wherein one or both of a flexural modulus of a 4 mm-thick film formed of the first resin and a flexural modulus of a 4 mm-thick film formed of the third resin is 1900 MPa or more and 2800 MPa or less.

<3> The layered film according to <1> or <2>, wherein one or both of the first resin and the third resin contain a polymer having crystallizability and containing an alicyclic structure.

<4> The layered film according to any one of <1> to <3>, wherein a thickness of the layered film is 50 μm or less.

<5> A polarizing plate comprising: a polarizer; and the layered film according to any one of <1> to <4>.

<6> A method for producing the layered film according to any one of <1> to <4>, comprising:

a step of drying the second resin; and a step of forming the first layer, the second layer, and the third layer using the first resin, the dried second resin, and the third resin.

Advantageous Effects of Invention

According to the present invention, it is possible to provide a layered film that is excellent in both heat resistance and bend resistance wherein formation of air bubbles is suppressed, a method for producing the same; and a polarizing plate having such a layered film.

BRIEF DESCRIPTION OF DRAWINGS

FIG. 1 is a cross-sectional view schematically showing a layered film according to an embodiment of the present invention.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "polarizing plate" encompasses not only a rigid member but also a flexible member such as a resin film, unless otherwise specified.

In the following description, "ultraviolet rays" means light having a wavelength of 10 nm or more and less than 400 nm, unless otherwise specified.

[1. Summary of Layered Film]

FIG. 1 is a cross-sectional view schematically showing a layered film 10 according to an embodiment of the present invention.

As shown in FIG. 1, the layered film 10 according to an embodiment of the present invention includes a first layer 110, a second layer 120, and a third layer 130 provided in this order. Further, the layered film 10 satisfies the following requirements (i) to (vi).

(i) The second resin contains an alkoxysilyl group-modified product of a hydrogenated product of a block copolymer.

(ii) The moisture content of the second resin as measured by the Karl-Fischer method after the second resin is immersed in water at 37° C. for 24 hours and then allowed to stand in an environment at 23° C. and a humidity of 70% for 24 hours is a specific value or less.

(iii) The second resin has a flexural modulus lower than that of a first resin and lower than that of a third resin.

(iv) One or both of the first resin and the third resin contain a polymer containing an alicyclic structure.

(v) The water vapor transmission rate of the first resin as measured in accordance with JIS K7129 B(1992) when the resin is in a form of a 100 μm-thick film is a specific value or less.

(vi) The ratio of the sum $T_{110}+T_{130}$ of the thickness $T_{110}$ of the first layer 110 and the thickness $T_{130}$ of the third layer 130 relative to the thickness $T_{120}$ of the second layer 120 "$(T_{110}+T_{130})/T_{120}$" falls within a specific range.

The layered film 10 satisfying the above-described requirements (i) to (vi) is excellent in both heat resistance and bend resistance and formation of air bubbles therein is suppressed. Therefore, the layered film 10 can suitably be used for optical use applications such as a polarizer protective film.

The layered film 10 may include an optional layer in addition to the first layer 110, the second layer 120, and the third layer 130. However, it is preferable that the first layer 110 and the second layer 120 are in direct contact with each other. Further, it is preferable that the second layer 120 and the third layer 130 are in direct contact with each other. Herein, "direct" contact between two layers means that another layer is not present between these two layers. Therefore, it is preferable that the layered film 10 is a three-layer structure film having only the first layer 110, the second layer 120, and the third layer 130.

[2. First Layer]

The first layer is formed of a first resin. As the first resin, a resin that contains a polymer and may further contain an optional component if necessary may be used. As the polymer, one type thereof may be solely used, and two or more types thereof may also be used in combination at an any ratio.

In the layered film, a resin containing a polymer having an alicyclic structure is used as one or both of the first resin and the third resin (requirement (iv)). Hereinafter, a polymer containing an alicyclic structure may be referred to as an "alicyclic structure-containing polymer" as appropriate. Therefore, when the third resin contained in the third layer contains an alicyclic structure-containing polymer, the first resin may or may not contain an alicyclic structure-containing polymer. On the other hand, when the third resin contained in the third layer does not contain an alicyclic structure-containing polymer, the first resin contains an alicyclic structure-containing polymer. In particular, it is preferable that both the first resin and the third resin contain an alicyclic structure-containing polymer.

Since the alicyclic structure-containing polymer has excellent mechanical strength, it can enhance bend resistance of the layered film. An alicyclic structure-containing polymer usually has low hygroscopicity. Therefore, the use of the resin containing an alicyclic structure-containing polymer can effectively reduce the water vapor transmission rate of the layered film. This can usually suppress deformation of the layered film in a high humidity environment, so that the moisture resistance of the layered film can be improved. Further, an alicyclic structure-containing polymer is usually excellent in transparency, size stability, and lightweight property.

The alicyclic structure-containing polymer is a polymer containing an alicyclic structure in the repeating unit. Examples thereof may include a polymer that is obtainable by a polymerization reaction using a cyclic olefin as a monomer, and a hydrogenated product thereof. As the alicyclic structure-containing polymer, any of a polymer containing an alicyclic structure in a main chain and a polymer containing an alicyclic structure in a side chain may be used. In particular, it is preferable that the alicyclic structure-containing polymer contains an alicyclic structure in the main chain. Examples of the alicyclic structure may include a cycloalkane structure and a cycloalkene structure, and a cycloalkane structure is preferable from the viewpoint of thermal stability and the like.

The number of carbon atoms contained in one alicyclic structure is preferably 4 or more, more preferably 5 or more, and even more preferably 6 or more, and is preferably 30 or less, more preferably 20 or less, and particularly preferably 15 or less. When the number of carbon atoms contained in one alicyclic structure falls within the aforementioned range, mechanical strength, heat resistance, and moldability are highly balanced.

The ratio of the repeating unit having an alicyclic structure in the alicyclic structure-containing polymer is preferably 30% by weight or more, more preferably 50% by weight or more, even more preferably 70% by weight or more, and particularly preferably 90% by weight. When the ratio of the repeating unit having an alicyclic structure is at a high level as described above, heat resistance can be enhanced.

The residual portion other than the repeating unit having an alicyclic structure in the alicyclic structure-containing polymer is not particularly limited, and may be appropriately selected depending on the purposes of use.

As the alicyclic structure-containing polymer contained in one or both of the first resin and the third resin, any of those having crystallizability and those having no crystallizability may be used. Both may be used in combination. Herein, the polymer having crystallizability refers to a polymer having a melting point Mp. The polymer having a melting point Mp refers to a polymer of which the melting point Mp can be observed by a differential scanning calorimeter (DSC). The use of the alicyclic structure-containing polymer having crystallizability can particularly effectively enhance the mechanical strength of the layered film, so that the bend resistance can be remarkably improved. Further, the use of an alicyclic structure-containing polymer having no crystallizability can reduce the production cost of the layered film.

Examples of the alicyclic structure-containing polymer having crystallizability may include the following polymer (α) to polymer (δ). Among these, the polymer (β) is particularly preferable as the alicyclic structure-containing polymer having crystallizability because a layered film having excellent heat resistance can be easily obtained therewith.

Polymer (α): a ring-opening polymer of a cyclic olefin monomer having crystallizability Polymer (β): a hydrogenated product of the polymer (α) having crystallizability Polymer (γ): an addition polymer of a cyclic olefin monomer having crystallizability Polymer (δ): a hydrogenated product and the like of the polymer (γ) having crystallizability Specifically, the alicyclic structure-containing polymer having crystallizability is preferably a ring-opening polymer of dicyclopentadiene having crystallizability and a hydrogenated product of a ring-opening polymer of dicyclopentadiene having crystallizability, and is particularly preferably a hydrogenated product of a ring-opening polymer of dicyclopentadiene having crystallizability. Herein, the ring-opening polymer of dicyclopentadiene refers to a polymer in which the ratio of the structural unit derived from dicyclopentadiene relative to the total structural units is usually 50% by weight or more, preferably 70% by weight or more, more preferably 90% by weight or more, and even more preferably 100% by weight.

It is preferable that the hydrogenated product of the ring-opening polymer of dicyclopentadiene has a high ratio of racemo•diad. Specifically, the ratio of the racemo•diad of the repeating unit in the hydrogenated product of the ring-opening polymer of dicyclopentadiene is preferably 51% or more, more preferably 60% or more, and particularly preferably 65% or more. A high ratio of racemo•diad indicates a high syndiotactic stereoregularity. Therefore, the melting point of the hydrogenated product of the ring-opening polymer of dicyclopentadiene tends to be higher when the ratio of the racemo•diad is higher.

The ratio of racemo•diad may be determined on the basis of the $^{13}$C-NMR spectrum analysis described in Examples described later.

The alicyclic structure-containing polymer having crystallizability may not have been crystallized prior to the production of the layered film. However, after the layered film is produced, the alicyclic structure-containing polymer having crystallizability contained in the layered film is usually crystallized and thereby can have a high crystallization degree. The range of the specific crystallization degree may be appropriately selected according to the desired performance, and is preferably 10% or more, and more preferably 15% or more. By setting the crystallization degree of the alicyclic structure-containing polymer contained in the layered film to be equal to or more than the lower limit value of the aforementioned range, high heat resistance and chemical resistance can be imparted to the layered film. The crystallization degree of the polymer may be measured by an X-ray diffraction method.

The melting point Mp of the alicyclic structure-containing polymer having crystallizability is preferably 200° C. or higher, and more preferably 230° C. or higher, and is preferably 290° C. or lower. By using an alicyclic structure-containing polymer having crystallizability and having such a melting point Mp, it is possible to obtain a layered film with still better balanced moldability and heat resistance.

For example, the aforementioned alicyclic structure-containing polymer having crystallizability may be produced by the method described in International Publication No. 2016/067893.

On the other hand, examples of the alicyclic structure-containing polymer having no crystallizability may include (1) a norbornene-based polymer, (2) a monocyclic olefin polymer, (3) a cyclic conjugated diene polymer, (4) a vinyl alicyclic hydrocarbon polymer, and hydrogenated products of these. Among these, a norbornene-based polymer and a hydrogenated product thereof are more preferable from the viewpoint of transparency and moldability.

Examples of the norbornene-based polymer include a ring-opening polymer of a norbornene-based monomer, a ring-opening copolymer of a norbornene-based monomer and another monomer copolymerization therewith, and hydrogenated products thereof; and an addition polymer of a norbornene-based monomer, and an addition copolymer of a norbornene-based monomer and another monomer copolymerizable therewith. Among these, a hydrogenated product of a ring-opening polymer of a norbornene-based monomer is particularly preferable from the viewpoint of transparency.

The aforementioned alicyclic structure-containing polymer is selected from, for example, polymers disclosed in Japanese Patent Application Laid-Open No. 2002-321302 A.

Various products are commercially available as resins containing an alicyclic structure-containing polymer having no crystallizability, and among these, those having desired properties may be appropriately selected and used. Examples of such commercially available products may include product groups having trade names "ZEONOR" (manufactured by ZEON Corporation), "ARTON" (manufactured by JSR Corporation), "APEL" (manufactured by Mitsui Chemicals, Inc.), and "TOPAS" (manufactured by Polyplastics Co., Ltd.).

The weight-average molecular weight (Mw) of the polymer contained in the first resin is preferably 10,000 or more, more preferably 15,000 or more, and particularly preferably 20,000 or more, and is preferably 100,000 or less, more preferably 80,000 or less, and particularly preferably 50,000 or less. A polymer having such a weight-average molecular weight is excellent in balance between mechanical strength, moldability, and heat resistance.

The molecular weight distribution (Mw/Mn) of the polymer contained in the first resin is preferably 1.2 or more, more preferably 1.5 or more, and particularly preferably 1.8 or more, and is preferably 3.5 or less, more preferably 3.4 or less, and particularly preferably 3.3 or less. When the molecular weight distribution is equal to or more than the lower limit value of the above-described range, the productivity of the polymer can be increased and the production cost can be suppressed. When the molecular weight distribution is equal to or less than the upper limit value, ratio of the low molecular component is confined in a small amount. Accordingly, relaxation at the time of high-temperature exposure can be suppressed, and stability of the layered film can thereby be increased.

The weight-average molecular weight Mw and the number average molecular weight Mn of the polymer may be measured as a polyisoprene-equivalent value by gel permeation chromatography (hereinafter abbreviated as "GPC") using cyclohexane as a solvent. If the resin does not dissolve in cyclohexane, toluene may be used as the solvent. When the solvent is toluene, the weight-average molecular weight Mw and the number-average molecular weight Mn may be measured as a polystyrene-equivalent value.

The ratio of the polymer in the first resin is preferably 80% by weight to 100% by weight, more preferably 90% by weight to 100% by weight, even more preferably 95% by weight to 100% by weight, and particularly preferably 98% by weight to 100% by weight, from the viewpoint of obtaining a layered film having particularly excellent heat resistance and bend resistance.

The first resin may contain an optional component in combination with the above-described polymer. Examples of the optional component may include: inorganic fine particles; a stabilizer such as an antioxidant, a heat stabilizer, an ultraviolet absorber, and a near-infrared light absorber; a resin modifier such as a lubricant and a plasticizer; a colorant such as a dye and a pigment; and an antistatic agent. As these optional components, one type thereof may be solely used, and two or more types thereof may also be used in combination at any ratio. However, from the viewpoint of significantly exhibiting the effect of the present invention, it is preferable that the content of the optional component is low. For example, the ratio of the sum of the optional components is preferably 20 parts by weight or less, more preferably 15 parts by weight or less, even more preferably 10 parts by weight or less, and particularly preferably 5 parts by weight or less, relative to 100 parts by weight of the polymer contained in the first resin. When the content of the optional components contained in the first resin is low, it is possible to suppress bleed-out of the optional component(s).

The first resin has low moisture permeability. Therefore, when the water vapor transmission rate of the first resin is measured in accordance with JIS K7129 B(1992) under conditions of a temperature of 40° C. and a humidity of 90% RH with the resin being in a form of a 100 μm-thick film, the value thereof is at a specific value or less (requirement (v)). More specifically, the water vapor transmission rate is usually 5 g/(m²·day) or less, preferably 2 g/(m²·day) or less, more preferably 1.5 g/(m²·day) or less, and particularly preferably 1 g/(m²·day) or less. The use of the first resin having such low moisture permeability can enhance the ability of the first layer to block water vapor, thereby preventing water vapor from entering into the second layer. Therefore, it is possible to prevent the second layer from being deteriorated by water vapor, so that heat resistance and bend resistance of the layered film can be improved by making use of excellent performance of the second layer. Further, the use of the first resin having a high ability to block water vapor can enhance the ability of the layered film to block water vapor, and therefore when the layered film is used as a polarizer protective film, a polarizer can effectively be protected from moisture. The lower limit value of the water vapor transmission rate is ideally zero, but may be 0.1 g/(m²·day).

The water vapor transmission rate may be measured by forming a film having a thickness of 100 μm with the first resin, and then performing the measurement with the film. The measurement of the water vapor transmission rate may be performed using a commercially-available water vapor transmission rate measuring device under conditions of a temperature of 40° C. and a humidity of 90% RH.

It is preferable that the first resin has a high flexural modulus. Specifically, the flexural modulus of a 4 mm-thick film formed of the first resin is preferably 1900 MPa or more, more preferably 2000 MPa or more, and particularly preferably 2100 MPa or more, and is preferably 2800 MPa or less, more preferably 2700 MPa or less, and particularly preferably 2600 MPa or less. When the flexural modulus of the film formed of the first resin is equal to or more than the lower limit value of the above-described range, rigidity of the first layer can be enhanced, and therefore handleability of the layered film can be enhanced. Further, when the flexural modulus of the film formed of the first resin is equal to or less than the upper limit value of the above-described range, flexibility of the layered film can be enhanced, and therefore bend resistance of the layered film can effectively be improved.

The flexural modulus may be measured by forming a film having a thickness of 4 mm with the first resin, and then performing the measurement with the film. The measurement of the flexural modulus may be performed in accordance with JIS K7171 at a temperature of 23° C.

The glass transition temperature Tg of the first resin is preferably 80° C. or higher, more preferably 85° C. or higher, and even more preferably 90° C. or higher, and is preferably 250° C. or lower, and more preferably 170° C. or lower. The polymer having a glass transition temperature within such a range has low tendency to cause deformation and stress under the high temperature usage, and exhibits good heat resistance.

The thickness of the first layer is set so that the ratio of the "sum of the thickness of the first layer and the thickness of the third layer" relative to the "thickness of the second layer" falls within a specific range (requirement (vi)). More specifically, the thickness ratio is usually 1 or more, preferably 1.2 or more, and particularly preferably 1.4 or more, and is usually 4 or less, preferably 3 or less, and particularly preferably 2 or less. When the thickness ratio falls within the above-described range, excellent properties of the first layer, the second layer, and the third layer are combined, and therefore a layered film excellent in heat resistance and bend resistance can be obtained. In particular, when the thickness ratio is equal to or more than the lower limit value of the above-described range, heat resistance can effectively be enhanced, and when the thickness ratio is equal to or less than the upper limit value of the above-described range, bend resistance can effectively be enhanced.

More specifically, the thickness of the first layer is preferably 5 μm or more, more preferably 8 μm or more, and particularly preferably 10 μm or more, and is preferably 20 μm or less, more preferably 18 μm or less, and particularly preferably 15 μm or less. When the thickness of the first layer is equal to or more than the lower limit value of the above-described range, the properties, such as heat resistance and bend resistance, of the layered body can effectively be improved by the action of the first layer. Further, the entry of moisture into the second layer can effectively be prevented. Further, when the first layer has such a large thickness, bleed-out of an optional component contained in the second layer can effectively be prevented. On the other hand, when the thickness of the first layer is equal to or less than the upper limit value of the above-described range, the thickness of the layered film can be reduced.

[3. Second Layer]

The second layer is formed of a second resin. As the second resin, a resin that contains an alkoxysilyl group-modified product of a hydrogenated product of a block copolymer and may further contain an optional component if necessary is used (requirement (i)). In the following description, the above-mentioned block copolymer may be appropriately referred to as "block copolymer [1]". In the following description, the hydrogenated product of the block copolymer [1] may be appropriately referred to as "hydrogenated product [2]". Further, in the following description, the above-mentioned alkoxysilyl group-modified product of the hydrogenated product [2] of the block copolymer [1] may be appropriately referred to as "alkoxysilyl-group modified product [3]".

It is preferable that the block copolymer [1] includes a polymer block [A] containing an aromatic vinyl compound unit and a polymer block [B] containing a chain conjugated diene compound unit. Among these, it is particularly preferable that the block copolymer [1] includes two or more polymer blocks [A] per molecule of the block copolymer [1] and one or more polymer blocks [B] per molecule of the block copolymer [1].

The polymer block [A] is a polymer block containing an aromatic vinyl compound unit. Herein, the aromatic vinyl compound unit refers to a structural unit having a structure formed by polymerizing an aromatic vinyl compound.

Examples of the aromatic vinyl compound corresponding to the aromatic vinyl compound unit of the polymer block [A] may include styrene; styrenes having an alkyl group of 1 to 6 carbon atoms as a substituent such as α-methylstyrene, 2-methylstyrene, 3-methylstyrene, 4-methylstyrene, 2,4-dimethylstyrene, 2,4-diisopropylstyrene; 4-t-butylstyrene, and 5-t-butyl-2-methylstyrene; styrenes having a halogen atom as a substituent such as 4-chlorostyrene, dichlorostyrene, and 4-monofluorostyrene; styrenes having an alkoxy group of 1 to 6 carbon atoms as a substituent such as 4-methoxystyrene; styrenes having an aryl group as a substituent such as 4-phenylstyrene; and vinylnaphthalenes such as 1-vinylnaphthalene and 2-vinylnaphthalene. As these compounds, one type thereof may be solely used, and two or more types thereof may also be used in combination at any ratio. Among these, an aromatic vinyl compound which does not include a polar group such as styrene and styrenes having an alkyl group of 1 to 6 carbon atoms as a substituent is preferable for making hygroscopicity low, and styrene is particularly preferable from the viewpoint of easy industrial availability.

The content ratio of the aromatic vinyl compound unit in the polymer block [A] is preferably 90% by weight or more, more preferably 95% by weight or more, and particularly preferably 99% by weight or more. The large amount of the aromatic vinyl compound unit in the polymer block [A] as described above can enhance rigidity and heat resistance of the second layer.

The polymer block [A] may include an optional structural unit other than the aromatic vinyl compound unit. The polymer block [A] may include any one type of the optional structural unit solely, and may also include two or more types thereof in combination at any ratio.

Examples of the optional structural unit which may be contained in the polymer block [A] may include a chain conjugated diene compound unit. Herein, the chain conjugated diene compound unit refers to a structural unit having a structure formed by polymerizing a chain conjugated diene compound. Examples of the chain conjugated diene compound corresponding to the chain conjugated diene compound unit may include the same examples as those mentioned as examples of the chain conjugated diene compound corresponding to the chain conjugated diene compound unit of the polymer block [B].

Examples of the optional structural unit which may be contained in the polymer block [A] may include a structural unit having a structure formed by polymerizing an optional unsaturated compound other than the aromatic vinyl compound and the chain conjugated diene compound. Examples of the optional unsaturated compounds may include a vinyl compound such as a chain vinyl compound and a cyclic vinyl compound; an unsaturated cyclic acid anhydride; and an unsaturated imido compound. These compounds may have a substituent such as a nitrile group, an alkoxycarbonyl group, a hydroxycarbonyl group, or a halogen group. Among these, from the viewpoint of hygroscopicity, a vinyl compound having no polar group such as a chain olefin of 2 to 20 carbon atoms per molecule such as ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene; or a cyclic olefin of 5 to 20 carbon atoms per molecule such as vinyl cyclohexane is preferable. A chain olefin of 2 to 20 carbon atoms per molecule is more preferable, and ethylene and propylene are particularly preferable.

The content ratio of the optional structural unit in the polymer block [A] is preferably 10% by weight or less, more preferably 5% by weight or less, and particularly preferably 1% by weight or less.

The number of the polymer blocks [A] in one molecule of the block copolymer [1] is preferably 2 or more, and is preferably 5 or less, more preferably 4 or less, and particularly preferably 3 or less. The plurality of polymer blocks [A] in one molecule may be the same as or different from each other.

The polymer block [B] is a polymer block containing a chain conjugated diene compound unit. As described above, the chain conjugated diene compound unit refers to a structural unit having a structure formed by polymerizing a chain conjugated diene compound.

Examples of the chain conjugated diene compound corresponding to the chain conjugated diene compound unit contained in the polymer block [B] may include 1,3-butadiene, isoprene, 2,3-dimethyl-1,3-butadiene, and 1,3-pentadiene. As the compounds, one type thereof may be solely used, and two or more types thereof may also be used in combination at any ratio. Among these, a chain conjugated diene compound containing no polar group is preferable, and 1,3-butadiene and isoprene are particularly preferable, because therewith hygroscopicity can be lowered.

The content ratio of the chain conjugated diene compound unit in the polymer block [B] is preferably 90% by weight or more, more preferably 95% by weight or more, and particularly preferably 99% by weight or more. The large amount of the chain conjugated diene compound unit in the polymer block [B] as described above can improve flexibility of the second layer.

The polymer block [B] may include an optional structural unit other than the chain conjugated diene compound unit. The polymer block [B] may include one type of the optional structural unit solely, and may also include two or more types thereof in combination at any ratio.

Examples of the optional structural units which may be contained in the polymer block [B] may include an aromatic vinyl compound unit and a structural unit having a structure formed by polymerizing an optional unsaturated compound other than the aromatic vinyl compound and the chain conjugated diene compound. Examples of these aromatic vinyl compound unit and structural unit having a structure formed by polymerizing an optional unsaturated compound may include the same examples as those exemplified as those which may be contained in the polymer block [A].

The content ratio of the optional structural unit in the polymer block [B] is preferably 10% by weight or less, more preferably 5% by weight or less, and particularly preferably 1% by weight or less. The low content ratio of the optional structural unit in the polymer block [B] can improve the flexibility of the second layer.

The number of the polymer blocks [B] in one molecule of the block copolymer [1] is usually 1 or more, and may be 2 or more. When the number of the polymer blocks [B] in the block copolymer [1] is two or more, the polymer blocks [B] may be the same as or different from each other.

The block form of the block copolymer [1] may be a chain type block or a radial type block. Among these, a chain type block is preferable because of excellent mechanical strength. When the block copolymer [1] has the form of a chain type block and the polymer blocks [A] are present at both ends of the molecular chain of the block copolymer [1], stickiness of the second layer can be suppressed to a desirably low value.

A particularly preferable block form of the block copolymer [1] is a triblock copolymer in which the polymer blocks [A] are bonded to both ends of the polymer block [B] as represented by [A]-[B]-[A]; or a pentablock copolymer in which the polymer blocks [B] are bonded to both ends of the polymer block [A], and the polymer blocks [A] are further bonded to the other ends of both the polymer blocks [B] as represented by [A]-[B]-[A]-[B]-[A]. In particular, the triblock copolymer of [A]-[B]-[A] is particularly preferable because it can be easily produced and the properties can be easily kept within desired ranges.

In the block copolymer [1], it is preferable that the ratio (wA/wB) of the weight fraction wA of the polymer block [A] in the entirety of the block copolymer [1] to the weight fraction wB of the polymer block [B] in the entirety of the block copolymer [1] falls within a specific range. Specifically, the aforementioned ratio (wA/wB) is preferably 40/60 or more, more preferably 50/50 or more, and particularly preferably 70/30 or more, and is preferably 95/5 or less, more preferably 90/10 or less, and particularly preferably 85/15 or less. When the aforementioned ratio wA/wB is equal to or more than the lower limit value of the aforementioned range, rigidity and heat resistance of the second layer can be improved and birefringence can be reduced. When the aforementioned ratio wA/wB is equal to or less than the upper limit value of the aforementioned range, flexibility of the second layer can be improved. Herein, the weight fraction wA of the polymer block [A] indicates the weight fraction of all of the polymer block [A]'s, and the weight fraction wB of the polymer block [B] indicates the weight fraction of all of the polymer block [B]'s.

The weight-average molecular weight (Mw) of the aforementioned block copolymer [1] is preferably 30,000 or more, more preferably 40,000 or more, and particularly preferably 50,000 or more, and is preferably 200,000 or less, more preferably 150,000 or less, and particularly preferably 100,000 or less.

The molecular weight distribution (Mw/Mn) of the block copolymer [1] is preferably 3 or less, more preferably 2 or less, and particularly preferably 1.5 or less, and is preferably 1.0 or more.

The weight-average molecular weight (Mw) and molecular weight distribution (Mw/Mn) of the aforementioned block copolymer [1] may be measured as a polystyrene-equivalent value by gel permeation chromatography (GPC) using tetrahydrofuran (THF) as a solvent.

As a method for producing the block copolymer [1], for example, the methods described in International Publication No. 2015/099079 and Japanese Patent Application Laid-Open No. 2016-204217 A may be employed.

The hydrogenated product [2] is a polymer obtained by hydrogenating unsaturated bonds of the block copolymer [1]. Herein, the unsaturated bonds of the block copolymer [1] to be hydrogenated include both the aromatic and non-aromatic carbon-carbon unsaturated bonds in the main chain and the side chain of the block copolymer [1].

The hydrogenation rate of the hydrogenated product [2] is preferably 90% or more, more preferably 97% or more, and particularly preferably 99% or more. Unless otherwise specified, the hydrogenation rate of the hydrogenated product [2] is determined as a ratio of the hydrogenated bonds among the aromatic and non-aromatic carbon-carbon unsaturated bonds in the main and side chains of the block copolymer [1]. By having a high hydrogenation rate, transparency, heat resistance and weather resistance of the second layer can be improved, and furthermore, the birefringence of the second layer can be easily reduced. Herein, the hydrogenation rate of the hydrogenated product [2] may be determined by measurement with $^1$H-NMR. The upper limit of the hydrogenation rate of the hydrogenated product [2] may be 100% or less.

The hydrogenation rate of the non-aromatic carbon-carbon unsaturated bonds is preferably 95% or more, and more preferably 99% or more. By having a high hydrogenation rate of the non-aromatic carbon-carbon unsaturated bonds, light resistance and oxidation resistance of the second layer can further be improved.

The hydrogenation rate of the aromatic carbon-carbon unsaturated bonds is preferably 90% or more, more preferably 93% or more, and particularly preferably 95% or more. By having a high hydrogenation rate of the aromatic carbon-carbon unsaturated bonds, the glass transition temperature of the polymer block obtained by hydrogenating the polymer block [A] becomes high, so that heat resistance of the second layer can be effectively enhanced. Furthermore, the photoelastic coefficient of the second layer can be reduced.

The weight-average molecular weight (Mw) of the hydrogenated product [2] is preferably 30,000 or more, more preferably 40,000 or more, and even more preferably 45,000 or more, and is preferably 200,000 or less, more preferably 150,000 or less, and particularly preferably 100,000 or less. When the weight-average molecular weight (Mw) of the hydrogenated product [2] falls within the aforementioned range, mechanical strength and heat resistance of the second layer can be improved, and furthermore, birefringence of the second layer can be easily reduced.

The molecular weight distribution (Mw/Mn) of the hydrogenated product [2] is preferably 3 or less, more preferably 2 or less, and particularly preferably 1.8 or less, and is preferably 1.0 or more. When the molecular weight distribution (Mw/Mn) of the hydrogenated product [2] falls within the aforementioned range, mechanical strength and heat resistance of the second layer can be improved, and further, birefringence of the second layer can be easily reduced.

The weight-average molecular weight (Mw) and the molecular weight distribution (Mw/Mn) of the hydrogenated product [2] may be determined as a polystyrene-equivalent value by gel permeation chromatography (GPC) using tetrahydrofuran as a solvent.

The aforementioned hydrogenated product [2] may be produced by hydrogenating the block copolymer [1]. As the hydrogenation method, a hydrogenation method capable of increasing the hydrogenation rate and reducing the chain scission reaction of the block copolymer [1] is preferable. Examples of such hydrogenation methods may include the methods described in International Publication No. 2015/099079 and Japanese Patent Application Laid-Open No. 2016-204217 A.

The alkoxysilyl group-modified product [3] is a polymer obtained by introducing an alkoxysilyl group into the hydrogenated product [2] of the aforementioned block copolymer [1]. The alkoxysilyl group may be bonded directly to the aforementioned hydrogenated product [2], or may be bonded indirectly thereto via a divalent organic group such as an alkylene group, for example. The alkoxysilyl group-modified product [3] is excellent in adhesion to various materials. Therefore, the second layer formed of the second resin containing the alkoxysilyl group-modified product [3] is excellent in adhesion to the first layer and the third layer. Therefore, peeling of the second layer due to heat and stress can be suppressed, and also thereby heat resistance and bend resistance of the layered film can be enhanced.

The amount of the alkoxysilyl group introduced in the alkoxysilyl group-modified product [3] is preferably 0.1 part by weight or more, more preferably 0.2 part by weight or more, and particularly preferably 0.3 part by weight or more, and is preferably 10 parts by weight or less, more preferably 5 parts by weight or less, and particularly preferably 3 parts by weight or less, relative to 100 parts by weight of the hydrogenated product [2] before the introduction of the alkoxysilyl group. When the amount of the alkoxysilyl group introduced falls within the aforementioned range, it is possible to prevent the degree of cross-linking between the alkoxysilyl groups decomposed by moisture or the like from becoming excessively high, so that the adhesion of the second layer can be maintained high.

The amount of the alkoxysilyl group introduced may be measured with $^1$H-NMR spectrum. When the amount of the alkoxysilyl group introduced is small, the number of times of integration during measurement may be increased.

Usually, the weight-average molecular weight (Mw) of the alkoxysilyl group-modified product [3] is not largely changed from the weight-average molecular weight (Mw) of the hydrogenated product [2] before introduction of the alkoxysilyl group because the amount of the alkoxysilyl group introduced is small. However, when an alkoxysilyl group is introduced, the hydrogenated product [2] is usually subjected to a modification reaction in the presence of a peroxide. Therefore, the crosslinking reaction and the scission reaction of the hydrogenated product [2] proceed, and the molecular weight distribution tends to largely change. The weight-average molecular weight (Mw) of the alkoxysilyl group-modified product [3] is preferably 30,000 or more, more preferably 40,000 or more, and even more preferably 45,000 or more, and is preferably 200,000 or less, more preferably 150,000 or less, and even more preferably 100,000 or less. The molecular weight distribution (Mw/Mn) of the alkoxysilyl group-modified product [3] is preferably 3.5 or less, more preferably 2.5 or less, and particularly preferably 2.0 or less, and is preferably 1.0 or less. When the weight-average molecular weight (Mw) and the molecular weight distribution (Mw/Mn) of the alkoxysilyl group-modified product [3] fall within these ranges, good mechanical strength and tensile elongation of the second layer can be maintained.

The weight-average molecular weight (Mw) and molecular weight distribution (Mw/Mn) of the alkoxysilyl group-modified product [3] may be measured as a polystyrene equivalent value by gel permeation chromatography (GPC) using tetrahydrofuran as a solvent.

The alkoxysilyl group-modified product [3] may be produced by introducing an alkoxysilyl group into the hydrogenated product [2] of the block copolymer [1] described above. Examples of the method for introducing an alkoxysilyl group into the hydrogenated product [2] may include the methods described in International Publication No. 2015/099079 and Japanese Patent Application Laid-Open No. 2016-204217 A.

The ratio of the alkoxysilyl group-modified product [3] in the second resin is preferably 90% by weight to 100% by weight, more preferably 93% by weight to 100% by weight, even more preferably 95% by weight to 100% by weight, and particularly preferably 97% by weight to 100% by weight, from the viewpoint of obtaining a layered film having particularly excellent heat resistance and bend resistance.

The second resin may contain an optional component in combination with the alkoxysilyl group-modified product [3]. As the optional component, one type thereof may be solely used, and two or more types thereof may also be used in combination at any ratio. Since the second layer is provided between the first layer and the third layer, migration of the optional component contained in the second layer is prevented by the first layer and the third layer. Therefore, bleed-out of the optional component contained in the second resin of the layered film can be suppressed.

Examples of the optional component may include the same examples as those for the optional component that may be contained in the first resin. Among these, an ultraviolet absorber is preferable. An ultraviolet absorber is a compound having the ability to absorb ultraviolet rays. The use of the second resin containing an ultraviolet absorbent can provide the layered film with an ability to block ultraviolet rays. Therefore, when the layered film is used as a polarizer protective film, the polarizer can be protected from ultraviolet rays.

It is preferable to use an organic compound as the ultraviolet absorber. The use of an ultraviolet absorber as an organic compound can usually increase the light transmittance of the layered film at a visible wavelength and reduce the haze of the layered film compared with a case where an ultraviolet absorber as an inorganic compound is used. Examples of the ultraviolet absorber as an organic compound may include a triazine-based ultraviolet absorber, a benzophenone-based ultraviolet absorber, a benzotriazole-based ultraviolet absorber, an acrylonitrile-based ultraviolet absorber, a salicylate-based ultraviolet absorber, a cyanoacrylate-based ultraviolet absorber, an azomethine-based ultraviolet absorber, an indole-based ultraviolet absorber, a naphthalimide-based ultraviolet absorber, and a phthalocyanine-based ultraviolet absorber. Specific examples of these ultraviolet absorbers may include those described in Japanese Patent Application Laid-Open No. 2017-68227 A.

The ratio of the optional component in the second resin is preferably 3% by weight or more, more preferably 5% by weight or more, and particularly preferably 7% by weight or more, and is preferably 20% by weight or less, more preferably 15% by weight or less, and particularly preferably 10% by weight or less. When the ratio of the optional component is equal to or more than the lower limit value of the aforementioned range, the function of the optional component in the layered film can be effectively exhibited. When the ratio of the optional component is equal to or less than the upper limit value of the aforementioned range, gelation of the second resin can be easily suppressed.

The moisture content of the second resin as measured by the Karl-Fischer method after the second resin is immersed in water at 37° C. for 24 hours and then allowed to stand in an environment at 23° C. and a humidity of 70% for 24 hours is usually 0.020% by weight or less, preferably 0.015% by weight or less, more preferably 0.010% by weight or less, and particularly preferably 0.008% by weight or less (requirement (ii)). The second resin to be used for the layered film is subjected to an appropriate drying treatment to have a low moisture content. This makes it possible to prevent formation of air bubbles and holes in the layered film. Further, since the moisture content of the second resin is low, bend resistance of the layered film can be expected to be effectively improved.

The moisture content of the second resin is measured after the second resin is immersed in water at 37° C. for 24 hours and then allowed to stand under conditions of 37° C. and a relative humidity of 70% for 24 hours. This measurement may be performed using a Karl Fischer moisture titrator under conditions of a sample heating temperature of 150° C. and a sample heating time of 10 minutes.

The second resin has a flexural modulus lower than the flexural modulus of the first resin and also lower than the flexural modulus of the third resin (requirement (iii)). This can enhance bend resistance of the layered film.

Hereinafter, preferred specific ranges are shown. A difference between "the lower one of the flexural modulus of a 4 mm-thick film formed of the first resin and the flexural modulus of a 4 mm-thick film formed of the third resin", and "the flexural modulus of a 4 mm-thick film formed of the second resin" is referred to as "flexural modulus difference". This flexural modulus difference is preferably 1000 MPa or more, more preferably 1100 MPa or more, and particularly preferably 1200 MPa or more, and is preferably 2100 MPa or less, more preferably 2000 MPa or less, and particularly preferably 1900 MPa or less. When the flexural modulus difference is equal to or more than the lower limit value of the aforementioned range, bend resistance of the layered film can be effectively improved. When the flexural modulus difference is equal to or less than the upper limit value of the aforementioned range, excessively large flexural modulus of the first resin and the third resin, which relatively renders the action of the second resin being excessively small, can be avoided. Also thereby, bend resistance of the layered film can be effectively improved.

Further, the flexural modulus of the 4 mm-thick film formed of the second resin is preferably 550 MPa or more, more preferably 600 MPa or more, and particularly preferably 650 MPa or more, and is preferably 1000 MPa or less, more preferably 900 MPa or less, and particularly preferably 800 MPa or less. When the flexural modulus of the film formed of the second resin is equal to or more than the lower limit value of the aforementioned range, rigidity of the second layer can be enhanced, so that handleability of the layered film can be enhanced. When the flexural modulus of the film formed of the second film is equal to or less than the upper limit value of the aforementioned range, flexibility of the layered film can be increased, and thus, bend resistance of the layered film can be effectively enhanced.

The flexural modulus of the second resin may be measured by the same method as that for the flexural modulus of the first resin.

It is preferable that the water vapor transmission rate of the second resin is at a low level when the resin is in a form of a 100 μm-thick film and the measurement is performed in accordance with JIS K7129 B(1992) under conditions of a temperature of 40° C. and a humidity of 90% RH. Specifically, the water vapor transmission rate is preferably 5 g/(m²·day) or less, more preferably 4.5 g/(m²·day) or less, and even more preferably 4 g/(m²·day) or less. When the second resin has such low moisture permeability, the ability of the layered film to block water vapor can be effectively enhanced. Therefore, when the layered film is used as a polarizer protective film, the polarizer is effectively protected from moisture. The lower limit value of the water vapor transmission rate is ideally zero, and may be 0.1 g/m²·day.

The water vapor transmission rate of the second resin may be measured by the same method as that for the water vapor transmission rate of the first resin.

It is preferable that the second resin has a high ability to block ultraviolet rays. Such high ability to block ultraviolet rays may be realized by using a resin containing an ultraviolet absorber as the second resin. The use of the second resin having a high ability to block ultraviolet rays can also provide the layered film with a high ability to block ultraviolet rays. Therefore, when the layered film is used as a polarizer protective film, the polarizer can be protected from ultraviolet rays.

As described above, the thickness of the second layer is set such that the ratio of "the sum of the thickness of the first layer and the thickness of the third layer" relative to "the thickness of the second layer" falls within a specific range. Therefore, the thickness of the second layer is set within a range where the ratio of the thickness falls within the aforementioned range. Specifically, the thickness of the second layer is preferably 10 μm or more, more preferably 13 μm or more, and particularly preferably 15 μm or more, and is preferably 25 μm or less, more preferably 23 μm or less, and particularly preferably 20 μm or less. When the thickness of the second layer is equal to or more than the lower limit value of the aforementioned range, properties, such as heat resistance and bend resistance, of the layered body can be effectively improved by the action of the second layer. On the other hand, when the thickness of the second layer is equal to or less than the upper limit value of the aforementioned range, the thickness of the layered film can be reduced.

[4. Third Layer]

The third layer is formed of the third resin. As the third resin, a resin that contains a polymer and may further contain an optional component if necessary may be used. As the polymer, one type thereof may be solely used, and two or more types thereof may also be used in combination at any ratio.

As described above, the layered film employs a resin containing an alicyclic structure-containing polymer as one or both of the first resin and the third resin (requirement (iv)). Therefore, when the first resin contains the alicyclic structure-containing polymer, the third resin may or may not contain the alicyclic structure-containing polymer. When the first resin does not contain the alicyclic structure-containing polymer, the third resin contains the alicyclic structure-containing polymer. However, from the viewpoint of effectively enhancing heat resistance and bend resistance of the layered film, it is preferable that both the first resin and the third resin contain the alicyclic structure-containing polymer.

As the third resin, any resin described above as the first resin may be used. By using such a resin, the same effect as the first layer can be obtained by the third layer. The first resin and the third resin may be different from each other, but are preferably the same as each other from the viewpoint of reducing the production cost of the layered film and preventing curling.

It is preferable that the third resin has low moisture permeability. Specifically, it is preferable that the water vapor transmission rate of the third resin falls within the same range as the above-described water vapor transmission rate of the first resin, the water vapor transmission rate being measured for the resin being in a form of a 100 μm-thick film and the measurement being performed in accordance with JIS K7129 B(1992). When the third resin has low moisture permeability, the same effect as that of the first resin can be obtained.

The water vapor transmission rate of the third resin may be measured by the same method as used to measure the water vapor transmission rate of the first resin.

It is preferable that the third resin has a high flexural modulus. Specifically, it is preferable that the flexural modulus of a 4 mm-thick film of the third resin falls within the same range as the above-described range of the flexural modulus of the first resin. When the third resin has a high flexural modulus, the same effect as that of the first resin can be obtained. In particular, when both the first resin and the third resin have the flexural modulus in the above-described range, bend resistance of the layered film can be particularly effectively improved.

The flexural modulus of the third resin may be measured by the same method as that for the flexural modulus of the first resin.

It is preferable that the glass transition temperature of the third resin is in the same range as that of the glass transition temperature of the first resin. By having such a feature, the same effect as the effect of the first resin can be obtained.

As described above, the thickness of the third layer is set so that the ratio of the "sum of the thickness of the first layer and the thickness of the third layer" relative to the "thickness of the second layer" falls within a specific range. Therefore, the thickness of the third layer is set within a range where the ratio of the thickness falls within the aforementioned range. Specifically, it is preferable that the thickness of the third layer is in the same range as that for the thickness of the first layer. When the thickness of the third layer falls within the aforementioned range, the same effect as that of the first layer can be obtained. The thickness of the first layer and the thickness of the third layer may be different from each other, but are preferably the same as each other from the viewpoint of effectively suppressing curling of the layered film.

[5. Optional Layer]

The layered film may include an optional layer if necessary in combination with the above-described first layer, second layer, and third layer. For example, the layered film may include an optional layer provided on a side of the first layer that is opposite to the second layer or on a side of the third layer that is opposite to the second layer. Examples of the optional layer may include a hard coat layer, a low refractive index layer, an antistatic layer, and an index matching layer. However, it is preferable that the layered film is a three-layer structure film having no optional layer from the viewpoint of reducing the thickness of the layered film.

[6. Properties and Thickness of Layered Film]

The layered film has excellent heat resistance. Therefore, deterioration in the surface properties of the layered film in a high-temperature environment can be prevented. For example, when a layered film according to an embodiment of the present invention is allowed to stand in an atmosphere of 140° C. for 10 minutes without applying tension to the layered film, the occurrence of protrusion and/or recession on both surfaces of the layered film can be prevented.

Further, since the layered film includes the first or third layer containing the alicyclic structure-containing polymer, the layered film usually has excellent size stability even in, particularly, a high-temperature and high-humidity environment. In particular, when the alicyclic structure-containing polymer having crystallizability is used, the above-described effect can remarkably be obtained.

The layered film has excellent bend resistance. Therefore, even when the layered film is repeatedly bent, the occurrence of cracking, creasing, and whiting thereof can be suppressed. For example, even when a layered film according to an embodiment of the present invention is repeatedly bent 100000 times in a bend resistance test that will be described later in Examples, the occurrence of cracking, creasing, and white turbidity can be suppressed.

In the layered film, formation of air bubbles is suppressed. Therefore, the layered film usually has few air bubbles therein, and preferably has no air bubbles therein.

It is preferable that the light transmittance of the layered film at a wavelength of 380 nm is low. A low light transmittance at a wavelength of 380 nm means that an ability to block ultraviolet rays is excellent. When the layered film having an excellent ability to block ultraviolet rays is used as a polarizer protective film, a polarizer can be protected from ultraviolet rays. In general, organic components contained in organic EL display devices are particularly likely to be deteriorated by long-wavelength ultraviolet rays. Therefore, when the layered film is provided in an organic EL display device, deterioration of organic components can effectively be prevented.

It is preferable that the layered film has a high total light transmittance from the viewpoint of being used as an optical film. Specifically, the total light transmittance of the layered film is preferably 85% to 100%, more preferably 87% to 100%, and particularly preferably 90% to 100%. The total light transmittance may be measured using a commercially-available spectrophotometer in a wavelength range of 400 nm or more and 700 nm or less.

It is preferable that the layered film has a low haze from the viewpoint of enhancing the image sharpness of an image display device including the layered film incorporated therein. The haze of the layered film is preferably 1% or less, more preferably 0.8% or less, and particularly preferably 0.5% or less. The haze may be measured using a turbidimeter in accordance with JIS K7361-1997.

The thickness of the layered film is preferably 20 μm or more, more preferably 25 μm or more, and particularly preferably 30 μm or more, and is preferably 50 μm or less, more preferably 47 μm or less, and particularly preferably 45 μm or less. When the thickness of the layered film is equal to or more than the lower limit value of the above-described range, heat resistance and rigidity required for optical film use applications can be ensured. When the thickness thereof is equal to or less than the upper limit value thereof, light-weight property and compactness required for optical film use applications can be achieved.

[7. Method for Producing Layered Film]

The layered film may be produced by a production method including the steps of: drying a second resin; and forming a first layer, a second layer, and a third layer using a first resin, the dried second resin, and a third resin.

In the step of drying a second resin, the drying temperature is preferably 40° C. or higher, more preferably 45° C. or higher, and particularly preferably 50° C. or higher. When the drying temperature is equal to or higher than the lower limit value of the above-described range, fast proceeding of drying process can be achieved. The upper limit of the drying temperature is not particularly limited. However, in the industrial process, the step of drying a second resin is performed on production line, and therefore the drying step is often performed while the second resin is being conveyed. It is preferable that the second resin conveyed in such a manner is prevented from being thermally fused. From the viewpoint of stably preventing fusion, the drying temperature is preferably 100° C. or lower, more preferably 80° C. or lower, and particularly preferably 70° C. or lower.

In the step of drying a second resin, the drying time is preferably 180 minutes or longer, more preferably 210 minutes or longer, and particularly preferably 240 minutes or longer, and is preferably 720 minutes or shorter, more preferably 660 minutes or shorter, and particularly preferably 600 minutes or shorter. When the drying time is equal to or longer than the lower limit value of the above-described range, the moisture content of the second resin can effectively be reduced. When the drying time is equal to or shorter than the upper limit value of the above-described range, deterioration of the resin can be prevented, and the production time of the layered film can be reduced to enhance production efficiency.

After the second resin is dried, the step of forming a first layer, a second layer, and a third layer using a first resin, the dried second resin, and a third resin is performed to produce a layered film. The method for forming the first layer, the second layer, and the third layer is not particularly limited. For example, the first layer, the second layer, and the third layer may be formed by a formation method including the step of molding the first resin, the second resin, and the third resin into films. Examples of the molding method may include a co-extrusion method and a co-casting method. Among these molding methods, a co-extrusion method is preferable because production efficiency is excellent and volatile components are less likely to remain in the layered film.

The co-extrusion method includes the step of co-extruding the first resin, the second resin, and the third resin. In the co-extrusion method, the first resin, the second resin, and the third resin are extruded as layers in a melted state to form the first layer, the second layer, and the third layer, respectively. In this case, examples of a method for extruding the resins may include a co-extrusion T-die method, a co-extrusion inflation method, and a co-extrusion lamination method. Among these, a co-extrusion T-die method is preferable. The co-extrusion T-die method includes a feed block system and a multi-manifold system, and a multi-manifold system is particularly preferable in terms of reducing thickness variations.

The method for producing a layered film may further include an optional step in combination with the above-described steps. For example, the method for producing a layered film may include a stretching step of subjecting the layered film to a stretching treatment. When the layered film is subjected to such a stretching treatment, the thickness of the layered film can be reduced, mechanical strength of the layered film can be enhanced, and the layered film can exhibit desired optical properties.

[8. Polarizing Plate]

The layered film described above may be used for a wide range of use applications as an optical film such as a phase difference film, a polarizer protective film, and a polarization compensation film. Among these, it is preferable to use the layered film as a polarizer protective film.

A polarizing plate according to an embodiment of the present invention includes a polarizer and the above-described layered film. The layered film may be provided on only one side of the polarizer, or may be provided on both sides thereof. Since the layered film has excellent heat resistance, deterioration in performance of this polarizing plate in a high-temperature environment can be suppressed. Further, since the layered film has excellent bend resistance, this polarizing plate itself also has excellent bend resistance. Therefore, this polarizing plate can be applied to a flexible display of, e.g., an organic EL display device.

As the polarizer, a film that can transmit one of two linearly polarized lights having vibration directions perpendicular to each other and absorb or reflect the other can be used. The vibration direction of the linearly polarized light means the vibration direction of the electric field of the linearly polarized light. Specific examples of the polarizer may include: a film obtained by subjecting a film of a vinyl alcohol-based polymer, such as polyvinyl alcohol or partially formalized polyvinyl alcohol, to an appropriate treatment such as a dyeing treatment with iodine and a dichroic substance such as a dichroic dye, a stretching treatment, and a crosslinking treatment, in an appropriate order by an appropriate procedure. In particular, a polarizer containing polyvinyl alcohol is preferable. The thickness of the polarizer is usually 5 μm to 80 μm.

The polarizing plate may be produced by bonding the layered film on a polarizer. If necessary, an adhesive may be used for bonding.

The polarizing plate may further include an optional layer in combination with the polarizer and the layered film. For example, the polarizing plate may include an optional protective film layer other than the layered film in order to protect the polarizer. Further examples of the optional layer may include a hard coat layer, a low refractive index layer, an antistatic layer, and an index matching layer.

The polarizing plate obtained as described above may be used for an image display device such as an organic EL display device.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "ppm", "%", and "part" representing quantity are on the basis of weight, unless otherwise specified. Also, the following operations were performed at normal temperature and under normal pressure, unless otherwise specified.

[Evaluation Methods]

[Method for Measuring Molecular Weight]

The weight-average molecular weight and number-average molecular weight of a polymer were measured as a standard polystyrene-equivalent value at 38° C. by gel permeation chromatography using tetrahydrofuran as an eluent. As a measuring device, HLC8320 GPC manufactured by Tosoh Corporation was used.

[Method for Measuring Glass Transition Temperature Tg and Melting Point Mp]

The glass transition temperature Tg and melting point Mp of the sample were each measured using a differential scanning calorimeter (DSC) at a temperature rise rate of 10° C./min.

[Method for Measuring Hydrogenation Rate]

The hydrogenation rate of the polymer was measured by $^1$H-NMR.

[Method for Measuring Racemo•Diad Ratio of Polymer]

The polymer was subjected to $^{13}$C-NMR measurement at 200° C. by an inverse-gated decoupling method using orthodichlorobenzene-$d^4$/trichlorobenzene-$d^3$ (mixing ratio (on a weight basis) ½) as a solvent. In the result of this $^{13}$C-NMR measurement, a signal at 43.35 ppm attributed to a meso·diad and a signal at 43.43 ppm attributed to a racemo·diad were identified using a peak at 127.5 ppm of orthodichlorobenzene-d$^4$ as a reference shift. On the basis of the intensity ratio between these signals, the racemo·diad ratio of the polymer was determined.

[Method for Measuring Flexural Modulus]

A sheet-shaped film having a thickness of 4 mm was formed by injection molding using the resin as a sample. The flexural modulus of the obtained film was measured at a temperature of 23° C. in accordance with JIS K7171. As the measuring device, a tensile tester ("Model 5564" manufactured by Instron) was used.

[Method for Measuring Water Vapor Transmission Rate]

A film having a thickness of 100 μm was formed by an extrusion molding method using a resin as a sample. The water vapor transmission rate of the obtained film was measured in accordance with JIS K7129 B (1992). The measurement was performed using a water vapor transmission rate measuring device ("PERMATRAN-W" manufactured by MOCON) under conditions of a temperature of 40° C. and a humidity of 90% RH.

[Method for Measuring Moisture Content of Resin]

The resin as a sample was immersed in water at 37° C. for 24 hours. After that, the resin was taken out of the water, and was allowed to stand in a constant-temperature constant-humidity chamber adjusted to 37° C. and 70% RH (relative humidity) for 24 hours. After that, the sample was taken out of the constant-temperature constant-humidity chamber, and the moisture content of the sample was immediately measured. The measurement of the moisture content was performed using a Karl-Fischer moisture titrator ("Coulometric Moisture Meter CA-200" manufactured by Mitsubishi Chemical Analytech Co., Ltd.) having a water vaporizer ("VA-200" manufactured by Mitsubishi Chemical Analytech Co., Ltd.) under conditions of a sample heating temperature of 150° C. and a sample heating time of 10 minutes.

[Method for Measuring Thickness]

The total thickness of the layered film including the first layer, the second layer, and the third layer was measured using a snap gage.

Further, the layered film was sliced using a microtome to obtain a cut piece having a thickness of 0.05 μm. After that, the cross-section surface of the cut piece that had appeared by slicing was observed with an optical microscope to measure the thickness of each of the first layer, the second layer, and the third layer.

[Method for Measuring Total Light Transmittance]

The total light transmittance of the layered film was determined as an average of values measured at 5 positions in accordance with JIS K7361 using "Haze Meter NDH-4000" manufactured by Nippon Denshoku Industries Co., Ltd.

[Method for Evaluating Heat Resistance]

The layered film was allowed to stand in an atmosphere of 140° C. for 10 minutes without applying tension to the layered film. After that, the surface properties of the layered film were visually observed.

When at least one protrusion and/or recession was observed in at least one surface of the layered film, the upper-temperature limit of the layered film was evaluated as lower than 140° C., and therefore judged as "poor" indicating inferior heat resistance.

When no protrusion and/or recession was observed in both surfaces of the layered film, the upper-temperature limit of the layered film was evaluated as 140° C. or higher, and therefore judged as "excellent" indicating superior heat resistance.

Herein, the protrusion and/or recession observed on the surface of the film after the heat resistance test is referred to as minute protrusion and/or recession locally formed on the layered film by thermal expansion or shrinkage.

[Method of Bend Resistance Test]

The layered film was subjected to a bend resistance test by a tension-free U-shape folding test method for a planar object with the use of a desktop model endurance test machine ("DLDMLH-FS" manufactured by Yuasa System Co., Ltd.). Bending was repeatedly performed under conditions of a folding width of 50 mm, a bending radius of 2 mm, and a folding speed of 80 cycles/min with the first layer being located outside (on the side to which tensile stress was applied). The test machine was stopped every 1000 cycles after the number of bending cycles exceeded 1000 cycles until the number of bending cycles reached 10000 cycles, every 5000 cycles after the number of bending cycles exceeded 10000 cycles until the number of bending cycles reached 50000 cycles, and every 10000 cycles after the number of bending cycles exceeded 50000 cycles to visually observe the layered film. When even slight cracking was observed on the layered film, the result was evaluated as "cracking", when a crease was made on the layered film, the result was evaluated as "creasing", and when a bent portion was whitened, the result was evaluated as "white turbidity". The evaluation was made four times under the condition that the upper limit of the number of bending cycles was 100000 cycles. In the four-time evaluations, the largest number of bending cycles at which "cracking", "creasing", or "white turbidity" occurred was adopted as the evaluation result.

[Method for Evaluating Appearance]

The layered film was evaluated by visual observation to determine the presence or absence of air bubbles.

Production Example 1: Production of Crystallizable COP Resin (1) Containing Hydrogenated Product of Ring-Opening Polymer of Dicyclopentadiene A pressure-resistant reaction vessel made of metal was sufficiently dried and then nitrogen replacement was performed. To this pressure-resistant reaction vessel, 154.5 parts of cyclohexane, 42.8 parts of a 70% cyclohexane solution of dicyclopentadiene (endo-isomer content: 99% or more) (amount of dicyopentadiene: 30 parts), and 1.9 parts of 1-hexene were added, and the resulting mixture was heated to 53° C.

A solution was prepared by dissolving 0.014 part of a tetrachlorotungsten phenylimide (tetrahydrofuran) complex in 0.70 part of toluene. To this solution, 0.061 part of a 19% diethylaluminum ethoxide/n-hexane solution was added, and the resulting mixture was stirred for 10 minutes to prepare a catalyst solution.

This catalyst solution was added to the pressure-resistant reaction vessel to initiate a ring-opening polymerization reaction. After that, the reaction was performed for 4 hours while the temperature was maintained at 53° C. to obtain a solution of a ring-opening polymer of dicyclopentadiene.

The obtained ring-opening polymer of dicyclopentadiene had a number-average molecular weight (Mn) of 8,750 and a weight-average molecular weight (Mw) of 28,100. The molecular weight distribution (Mw/Mn) determined from them was 3.21.

As a terminator, 0.037 part of 1,2-ethanediol was added to 200 parts of the obtained solution of the ring-opening polymer of dicyclopentadiene, and the resulting mixture was heated to 60° C. and stirred for 1 hour to terminate the polymerization reaction. 1 part of a hydrotalcite-like compound ("KYOWAAD (registered trademark) 2000" manufactured by Kyowa Chemical Industry Co., Ltd.) was added thereto, and the resulting mixture was heated to 60° C. and stirred for 1 hour. After that, 0.4 part of a filter aid ("Radiolite (registered trademark) #1500" manufactured by Showa Chemical Industry Co., Ltd.) was added, and the adsorbent and the solution were separated by filtration using a PP pleated cartridge filter ("TCP-HX" manufactured by ADVANTEC Toyo Kaisha Ltd.).

To 200 parts of the solution of the ring-opening polymer of dicyclopentadiene after filtration (amount of polymer: 30 parts), 100 parts of cyclohexane and 0.0043 part of chlorohydridecarbonyl tris(triphenylphosphine)ruthenium were added to perform a hydrogenation reaction at a hydrogen pressure of 6 MPa and 180° C. for 4 hours. As a result, a reaction liquid was obtained which contained a hydrogenated product of the ring-opening polymer of dicyclopentadiene. This reaction liquid was a slurry solution in which the hydrogenated product was precipitated.

The hydrogenated product and the solution contained in the reaction liquid were separated using a centrifugal separator, and the hydrogenated product was vacuum-dried at 60° C. for 24 hours to obtain 28.5 parts of the hydrogenated product of the ring-opening polymer of dicyclopentadiene having crystallizability. The hydrogenated product had a hydrogenation rate of 99% or higher, a glass transition temperature Tg of 93° C., a melting point (Mp) of 262° C., and a racemo•diad ratio of 89%.

100 parts of the obtained hydrogenated product of the ring-opening polymer of dicyclopentadiene was mixed with 1.1 parts of an antioxidant (tetrakis[methylene-3-(3',5'-di-t-butyl-4'-hydroxyphenyl)propionate]methane; "Irganox (registered trademark) 1010" manufactured by BASF Japan), and the resulting mixture was then fed into a twin screw extruder equipped with four die holes having an inner diameter of 3 mmϕ ("TEM-37B" manufactured by Toshiba Machine Co., Ltd.). The resin was molded by thermal melt extrusion using the twin screw extruder to obtain a strand-shaped molded body. After that, the molded body was cut with a strand cutter to obtain pellets of a crystallizable COP resin (1). The crystallizable COP resin (1) is a resin (glass transition temperature Tg: 92° C., melting point Mp: 260° C.) containing, as an alicyclic structure-containing polymer having crystallizability, the hydrogenated product of the ring-opening polymer of dicyclopentadiene.

The twin screw extruder was operated under the following conditions.

Barrel set temperature: 270° C. to 280° C.
Die set temperature: 250° C.
Screw rotation speed: 145 rpm
Feeder rotation speed: 50 rpm The flexural modulus and water vapor transmission rate of the obtained crystallizable COP resin (1) were measured by the above-described methods.

Production Example 2: Production of Si-Modified Resin (2) Containing Alkoxysilyl Group-Modified Product of Hydrogenated Product of Block Copolymer (First Stage: Extension of First Block St by Polymerization Reaction)

A stainless steel reaction vessel equipped with a stirrer was sufficiently dried and subjected to nitrogen replacement. Into the vessel, 550 parts of dehydrated cyclohexane, 25 parts of styrene, and 0.475 part of dibutyl ether were charged. A polymerization reaction was initiated by adding 0.68 part of an n-butyllithium solution (15% by weight in hexane) with stirring at 60° C. to perform a first-stage polymerization reaction. After a lapse of 1 hour from the initiation of the reaction, a sample was taken from the reaction mixture, and analyzed by gas chromatography (GC). As a result, the polymerization conversion rate was found to be 99.5%.

(Second Stage: Extension of Second Block Ip by Polymerization Reaction)

50 parts of dehydrated isoprene was added to the reaction mixture obtained in the first stage, and the resulting mixture was kept stirred for 30 minutes. A second-stage polymerization reaction was continuously initiated. After a lapse of 1 hour from the initiation of the second-stage polymerization reaction, a sample was taken from the reaction mixture, and analyzed by GC. As a result, the polymerization conversion rate was found to be 99.5%.

(Third Stage: Extension of Third Block St by Polymerization Reaction)

25 parts of dehydrated styrene was added to the reaction mixture obtained in the second stage to continuously initiate a third-stage polymerization reaction. After a lapse of 1 hour from the initiation of the third-stage polymerization reaction, a sample was taken from the reaction mixture, and the weight-average molecular weight Mw and number-average molecular weight Mn of a block copolymer were measured. Further, the sample taken at this stage was analyzed by GC, and as a result, the polymerization conversion rate was found to be almost 100%. After that, 0.5 part of isopropyl alcohol was immediately added to the reaction mixture to terminate the reaction. In this manner, a mixture containing the block copolymer was obtained.

The obtained block copolymer was found to be a polymer having a triblock molecular structure having a weight ratio of first block St-second block Ip-third block St of 25-50-25. The block copolymer had a weight-average molecular weight (Mw) of 47200 and a molecular weight distribution (Mw/Mn) of 1.05.

(Fourth Stage: Hydrogenation of Block Copolymer)

After that, the mixture containing the block copolymer was transferred into a pressure-resistant reaction vessel equipped with a stirrer, and 3.0 parts of a diatomaceous earth-supported nickel catalyst ("T-8400RL" manufactured by Sued-Chemie Catalyst) as a hydrogenation catalyst and 100 parts of dehydrated cyclohexane were added thereto and mixed therewith. The inside air of the reaction vessel was replaced with hydrogen gas, and hydrogen was further supplied while the solution was stirred to perform a hydrogenation reaction at a temperature of 190° C. and a pressure of 4.5 MPa for 8 hours. The hydrogenated product of the block copolymer contained in a reaction solution obtained by the hydrogenation reaction had a weight-average molecular weight (Mw) of 49900 and a molecular weight distribution (Mw/Mn) of 1.06.

(Fifth Stage: Removal of Volatile Components)

After the completion of the hydrogenation reaction, the reaction solution was filtered to remove the hydrogenation catalyst. After that, 2.0 parts of a xylene solution in which 0.1 part of pentaerythrityl tetrakis[3-(3,5-di-t-butyl-4-hydroxyphenyl)propionate] ("Songnox1010" manufactured by Songwon Industrial Co., Ltd.) was dissolved as a phenol-based antioxidant was added to and dissolved in the reaction solution.

After that, they solvent cyclohexane and xylene and other volatile components were removed from the above-described reaction solution using a cylindrical condenser dryer ("CONTRO" manufactured by Hitachi, Ltd.) at a temperature of 260° C. and a pressure of 0.001 MPa or less. The melted polymer was extruded in a strand shape through a die, cooled, and then pelletized using a pelletizer to obtain pellets of the resin containing the hydrogenated product of the block copolymer.

The hydrogenated product of the block copolymer contained in the obtained pelletized resin had a weight-average molecular weight (Mw) of 49500, a molecular weight distribution (Mw/Mn) of 1.10, and a hydrogenation rate of almost 100%.

(Sixth Stage: Modification with Ethylenic Unsaturated Silane Compound)

3.0 parts of vinyl trimethoxysilane and 0.2 part of 2,5-dimethyl-2,5-di(t-butylperoxy)hexane ("PERHEXA (registered trademark) 25B" manufactured by NOF CORPORATION) were added to 100 parts of the above-described resin pellets to obtain a mixture. This mixture was kneaded using a twin screw extruder at a resin temperature of 220° C. for a retention time of 60 seconds to 70 seconds and extruded in a strand shape. The extruded mixture was air-cooled and then cut with a pelletizer to obtain 96 parts of resin pellets containing an alkoxysilyl group-modified product of the hydrogenated product of the block copolymer.

10 parts of the resin pellets containing the alkoxysilyl group-modified product was dissolved in 100 parts of cyclohexane to obtain a solution. This solution was poured into 400 parts of dehydrated methanol to coagulate the alkoxysilyl group-modified product, and the resulting coagulate was obtained by filtration. The product obtained by filtration was vacuum-dried at 25° C. to isolate 9.0 parts of a crumb of the alkoxysilyl group-modified product.

The FT-IR spectrum of the alkoxysilyl group-modified product was measured. As a result, a new absorption band at 1090 $cm^{-1}$ attributed to an Si—$OCH_3$ group and new absorption bands at 825 $cm^{-1}$ and 739 $cm^{-1}$ attributed to an Si—$CH_2$ group were observed at positions different from the positions of absorption bands attributed to the Si—$OCH_3$ group and Si—CH group of vinyl trimethoxysilane (1075 $cm^{-1}$, 808 $cm^{-1}$, and 766 $cm^{-1}$).

Further, the $^1$H-NMR spectrum of the alkoxysilyl group-modified product (in deuterochloroform) was measured. As a result, a peak based on the proton of a methoxy group was observed at 3.6 ppm. From the peak area ratio, it was confirmed that 1.8 parts of vinyl trimethoxysilane was bonded to 100 parts of the hydrogenated product of the block copolymer before modification.

The resin thus obtained containing the alkoxysilyl group-modified product is referred to as an Si-modified resin (2) as appropriate.

The flexural modulus and water vapor transmission rate of the obtained Si-modified resin (2) were measured by the above-described methods.

Production Example 3: Preparation of Amorphous COP Resin (3) Containing Norbornene-Based Polymer Pellets of an amorphous norbornene-based polymer ("ZEONOR1600" manufactured by ZEON Corporation, glass transition temperature: 160° C.) were prepared as an amorphous COP resin (3).

The flexural modulus and water vapor transmission rate of this amorphous COP resin (3) were measured by the above-described methods.

Production Example 4: Production of UVA Resin (4) Containing Alkoxysilyl Group-Modified Product and Ultraviolet Absorber 90 parts by weight of the Si-modified resin (2) obtained in the above-described Production Example 2 and 10 parts by weight of a benzotriazole-based ultraviolet absorber ("ADK STAB LA-31" manufactured by ADEKA Corporation) were mixed by a twin screw extruder ("TEM-37B" manufactured by Toshiba Machine Co., Ltd.) to obtain pellets of a UVA resin (4) containing the alkoxysilyl group-modified product and the ultraviolet absorber.

The flexural modulus of this UVA resin (4) was measured by the above-described method.

Production Example 5: Preparation of PC Resin (5) Containing Polycarbonate

Pellets of a polycarbonate resin ("Iupilon H3000" manufactured by Mitsubishi Engineering-Plastics Corporation) were prepared as a PC resin (5).

The flexural modulus and water vapor transmission rate of this PC resin (5) were measured by the above-described methods.

Example 1

The Si-modified resin (2) produced in Production Example 2 was dried in a vacuum oven adjusted to 70° C. for 4 hours. The moisture content of the dried Si-modified resin (2) was measured. After drying of the Si-modified resin (2), a layered film including a first layer formed of a first resin, a second layer formed of a second resin, and a third layer formed of a third resin provided in this order was immediately produced by a co-extrusion molding method. More specifically, the co-extrusion molding method was performed in the following manner.

Three screw extruders equipped with a feeder (screw diameter: 20 mm, compression ratio: 3.1, ratio of screw effective length L relative to screw diameter D L/D=30), and a film melt-extrusion molding machine equipped with a hanger manifold-type T-die (stationary type, manufactured by GSI Creos Corporation) were prepared. The T-die of the extrusion molding machine was a type of T-die which is capable of co-extruding resins extruded from the screw extruders as layers to obtain a three layer-structure layered film. The T-die had a T-die width of 150 mm, a die lip opening of 0.8 mm, and a die lip width of 120 mm.

The crystallizable COP resin (1) produced in Production Example 1 was introduced into the screw extruders corresponding to the first layer and the third layer. The introduced crystallizable COP resin (1) was supplied to the T-die at an extrusion screw temperature of 280° C.

The dried Si-modified resin (2) was introduced into the screw extruder corresponding to the second layer. The introduced Si-modified resin (2) was supplied to the T-die at an extrusion screw temperature of 200° C.

The crystallizable COP resin (1) and the Si-modified resin (2) were discharged through the T-die at a die extrusion temperature (multi-manifold) of 280° C. and cast onto a cooling roll adjusted to 60° C. to obtain a layered film.

The obtained layered film was evaluated by the above-described methods.

Example 2

The thicknesses of the first layer, the second layer, and the third layer were changed as shown in Table 1 by adjusting the extrusion amounts of the resins by the feeder. Except for the matters described above, the production and evaluation of the layered film were performed by the same manner as that of Example 1.

Example 3

Instead of the crystallizable COP resin (1), the amorphous COP resin (3) prepared in Production Example 3 was introduced into a screw extruder corresponding to the first layer and the third layer. The thickness of the second layer was changed as shown in Table 1 by adjusting the extrusion amount of the resin by the feeder. Except for the matters described above, the production and evaluation of the layered film were performed by the same manner as that of Example 1.

Example 4

The UVA resin (4) produced in Production Example 4 was dried in a vacuum oven adjusted to 70° C. for 4 hours. The moisture content of the dried UVA resin (4) was measured. The dried UVA resin (4) was introduced into a screw extruder corresponding to the second layer instead of the Si-modified resin (2). Except for the matters described above, the production and evaluation of the layered film were performed by the same manner as that of Example 1.

Example 5

Instead of the crystallizable COP resin (1), the amorphous COP resin (3) prepared in Production Example 3 was introduced into a screw extruder corresponding to the third layer. Except for the matter described above, the production and evaluation of the layered film were performed by the same manner as that of Example 1. However, in Example 5, the crystallizable COP resin (1), the Si-modified resin (2), and the amorphous COP resin (3) extruded from the T-die were cast onto a cooling roll so that the first layer formed of the crystallizable COP resin (1) was in contact with the cooling roll.

Comparative Example 1

The thicknesses of the first layer, the second layer, and the third layer were changed as shown in Table 1 by adjusting the extrusion amounts of the resins by the feeder. Except for the matters described above, the production and evaluation of the layered film were performed by the same manner as that of Example 1.

Comparative Example 2

Instead of the crystallizable COP resin (1), the dried Si-modified resin (2) was introduced into the screw extruders corresponding to the first layer and the third layer. The extrusion screw temperature of the screw extruders corresponding to the first layer and the third layer was changed to 200° C.

The crystallizable COP resin (1) produced in Production Example 1 was dried in a vacuum oven adjusted to 100° C. for 4 hours. The moisture content of the crystallizable COP resin (1) was measured. The dried crystallizable COP resin (1) was introduced into a screw extruder corresponding to the second layer instead of the Si-modified resin (2). The extrusion screw temperature of the screw extruder corresponding to the second layer was changed to 280° C.

Except for the matters described above, the production and evaluation of the layered film were performed by the same manner as that of Example 1.

Comparative Example 3

Instead of the crystallizable COP resin (1), the PC resin (5) prepared in Production Example 5 was introduced into the screw extruders corresponding to the first layer and the third layer. The extrusion screw temperature of the screw extruders corresponding to the first layer and the third layer was changed to 300° C. Except for the matters described above, the production and evaluation of the layered film were performed by the same manner as that of Example 1.

Comparative Example 4

The Si-modified resin (2) produced in Production Example 2 was not dried. Except for the matter described above, the production and evaluation of the layered film were performed by the same manner as that of Example 1.

[Results]

The results of the above-described Examples and Comparative Examples are shown in the following Table 1 and Table 2. The meanings of abbreviated expressions in the following tables are as follows.

"Resin (1)": Crystallizable COP resin (1)
"Resin (2)": Si-modified resin (2)
"Resin (3)": Amorphous COP resin (3)
"Resin (4)": WA resin (4)
"Resin (5)": PC resin (5)
"Thickness ratio": Ratio of sum of thickness of first layer and thickness of third layer relative to thickness of second layer
"First resin water vapor transmission rate": Water vapor transmission rate of the first resin as measured in accordance with JIS K7129 B (1992) when the resin is in a form of a 100 µm-thick film
"Second resin water vapor transmission rate": Water vapor transmission rate of the second resin as measured in accordance with JIS K7129 B (1992) when the resin is in a form of a 100 µm-thick film
"Total light transmittance": Total light transmittance of layered film determined as average of values measured at 5 positions "Change caused by bending": Change caused by repeated bending in bend resistance test
"Number of bending cycles": Number of bending cycles at which cracking, creasing, or white turbidity occurs by repeated bending in bend resistance test

TABLE 1

Results of Examples

|  | Ex. 1 | Ex. 2 | Ex. 3 | Ex. 4 | Ex. 5 |
|---|---|---|---|---|---|
| First resin | Resin (1) | Resin (1) | Resin (3) | Resin (1) | Resin (1) |
| First layer thickness (μm) | 10 | 15 | 10 | 10 | 10 |
| Second resin | Resin (2) | Resin (2) | Resin (2) | Resin (4) | Resin (2) |
| Second layer thickness (μm) | 20 | 10 | 10 | 20 | 20 |
| Third layer | Resin (1) | Resin (1) | Resin (3) | Resin (1) | Resin (3) |
| Third layer thickness (μm) | 10 | 15 | 10 | 10 | 10 |
| Total thickness (μm) | 40 | 40 | 30 | 40 | 40 |
| Thickness ratio | 1 | 3 | 2 | 1 | 1 |
| Flexural modulus (Mpa) | | | | | |
| First resin | 1970 | 1970 | 2580 | 1970 | 1970 |
| Second resin | 680 | 680 | 680 | 650 | 680 |
| Third resin | 1970 | 1970 | 2580 | 1970 | 2580 |
| Second resin drying conditions | | | | | |
| Drying temperature | 70° C. | 70° C. | 70° C. | 70° C. | 70° C. |
| Drying time | 4 h | 4 h | 4 h | 4 h | 4 h |
| Second resin moisture content (ppm) | 53 | 46 | 55 | 63 | 51 |
| First resin water vapor transmission rate (g/(m² · day)) | 0.8 | 0.8 | 1.0 | 0.8 | 0.8 |
| Second resin water vapor transmission rate (g/(m² · day)) | 3.8 | 3.8 | 3.8 | 3.9 | 3.8 |
| Layered film evaluation results | | | | | |
| Appearance | No defect | No defect | No defect | No defect | No defect |
| Total light transmittance (%) | 92 | 91 | 91 | 91 | 92 |
| Heat resistance | Excellent | Excellent | Excellent | Excellent | Excellent |
| Change caused by bending | No change | No change | No change | No change | No change |
| Number of bending cycles | 100,000 | 100,000 | 100,000 | 100,000 | 100,000 |

TABLE 2

Results of Comparative Examples

|  | Comp. Ex. 1 | Comp. Ex. 2 | Comp. Ex. 3 | Comp. Ex. 4 |
|---|---|---|---|---|
| First resin | Resin (1) | Resin (2) | Resin (5) | Resin (1) |
| First layer thickness (μm) | 15 | 10 | 10 | 10 |
| Second resin | Resin (2) | Resin (1) | Resin (2) | Resin (2) |
| Second layer thickness (μm) | 5 | 20 | 20 | 20 |
| Third layer | Resin (1) | Resin (2) | Resin (5) | Resin (1) |
| Third layer thickness (μm) | 15 | 10 | 10 | 10 |
| Total thickness (μm) | 35 | 40 | 40 | 40 |
| Thickness ratio | 6 | 1 | 1 | 1 |
| Flexural modulus (Mpa) | | | | |
| First resin | 1970 | 680 | 2300 | 1970 |
| Second resin | 680 | 1970 | 680 | 680 |
| Third resin | 1970 | 680 | 2300 | 1970 |
| Second resin drying conditions | | | | |
| Drying temperature | 70° C. | 100° C. | 70° C. | None |
| Drying time | 4 h | 4 h | 4 h | None |
| Second resin moisture content (ppm) | 40 | Less than 10 | 55 | 220 |
| First resin water vapor transmission rate (g/(m² · day)) | 0.8 | 3.8 | 42 | 0.8 |
| Second resin water vapor transmission rate (g/(m² · day)) | 3.8 | 0.8 | 3.8 | 3.8 |
| Layered film evaluation results | | | | |
| Appearance | No defect | No defect | No defect | Air bubbles existed in film interior |
| Total light transmittance (%) | 91 | 91 | 89 | 92 |
| Heat resistance | Excellent | Poor (protrusion/recession existed) | Excellent | Excellent |

TABLE 2-continued

Results of Comparative Examples

| | Comp. Ex. 1 | Comp. Ex. 2 | Comp. Ex. 3 | Comp. Ex. 4 |
|---|---|---|---|---|
| Change caused by bending | Subtle cracks generated | No change | Cracks generated | No change |
| Number of bending cycles | 100,000 | 100,000 | Several times - several tens of times | 100,000 |

REFERENCE SIGN LIST

10 layered film
110 first layer
120 second layer
130 third layer

The invention claimed is:

1. A layered film comprising: a first layer formed of a first resin; a second layer formed of a second resin; and a third layer formed of a third resin, provided in this order, wherein
the second resin contains an alkoxysilyl group-modified product of a hydrogenated product of a block copolymer,
a moisture content of the second resin as measured by the Karl-Fischer method after the second resin is immersed in water at 37° C. for 24 hours and then allowed to stand in an environment at 23° C. and a humidity of 70% for 24 hours is 0.020% by weight or less,
the second resin has a flexural modulus lower than a flexural modulus of the first resin and lower than a flexural modulus of the third resin,
one or both of the first resin and the third resin contain a polymer containing an alicyclic structure,
a water vapor transmission rate of the first resin as measured in accordance with JIS K7129 B(1992) when the resin is in a form of a 100 μm-thick film is 5 g/(m$^2$·day) or less, and
a ratio of a sum of a thickness of the first layer and a thickness of the third layer relative to a thickness of the second layer is 1 or more and 4 or less.

2. The layered film according to claim 1, wherein one or both of a flexural modulus of a 4 mm-thick film formed of the first resin and a flexural modulus of a 4 mm-thick film formed of the third resin is 1900 MPa or more and 2800 MPa or less.

3. The layered film according to claim 1, wherein one or both of the first resin and the third resin contain a polymer having crystallizability and containing an alicyclic structure.

4. The layered film according to claim 1, wherein a thickness of the layered film is 50 μm or less.

5. A polarizing plate comprising: a polarizer; and the layered film according to claim 1.

6. A method for producing the layered film according to claim 1, comprising:
a step of drying the second resin; and
a step of forming the first layer, the second layer, and the third layer using the first resin, the dried second resin, and the third resin.

* * * * *